United States Patent
DeVries

(10) Patent No.: US 8,110,022 B2
(45) Date of Patent: Feb. 7, 2012

(54) HYDROGEN PURIFIER MODULE AND METHOD FOR FORMING THE SAME

(75) Inventor: Peter David DeVries, Spokane, WA (US)

(73) Assignee: Genesis Fueltech, Inc., Spokane, WA (US)

( * ) Notice: Subject to any disclaimer, the term of this patent is extended or adjusted under 35 U.S.C. 154(b) by 296 days.

(21) Appl. No.: 12/425,322

(22) Filed: Apr. 16, 2009

(65) Prior Publication Data

US 2010/0263538 A1    Oct. 21, 2010

(51) Int. Cl.
B01D 53/22    (2006.01)
B01D 67/00    (2006.01)

(52) U.S. Cl. ........... 95/56; 95/45; 95/55; 96/4; 96/9; 96/11; 228/193; 228/195; 228/197; 228/209; 228/254; 403/271; 403/272; 427/383.1; 55/502

(58) Field of Classification Search ......... 95/45, 55, 95/56; 96/4, 7, 9, 11; 55/523, 524, DIG. 5, 55/502; 228/193, 195, 196, 197, 209, 219, 228/226, 254; 403/265, 271, 272; 427/383.1
See application file for complete search history.

(56) References Cited

U.S. PATENT DOCUMENTS

| | | | |
|---|---|---|---|
| 5,782,960 A | 7/1998 | Ogawa et al. | |
| 5,904,754 A * | 5/1999 | Juda et al. | 96/11 |
| 6,183,542 B1 | 2/2001 | Bossard | |
| 6,582,499 B2 * | 6/2003 | Frost et al. | 96/7 |
| 6,602,325 B1 | 8/2003 | Frost et al. | |
| 6,673,400 B1 * | 1/2004 | Bedinger et al. | 95/56 |
| 6,835,232 B2 | 12/2004 | Frost et al. | |
| 7,114,644 B2 * | 10/2006 | Miyazaki | 228/219 |
| 7,168,608 B2 * | 1/2007 | Mei | 228/254 |
| 7,258,263 B2 * | 8/2007 | Sigler et al. | 228/215 |
| 7,353,982 B2 * | 4/2008 | Li | 228/193 |
| 7,396,384 B2 * | 7/2008 | Barker et al. | 95/56 |
| 7,495,333 B2 * | 2/2009 | Miyazaki et al. | 228/208 |
| 7,789,948 B2 * | 9/2010 | Nakamura et al. | 96/4 |
| 2003/0033933 A1 | 2/2003 | Frost et al. | |
| 2003/0155409 A1 * | 8/2003 | Dockus et al. | 228/254 |
| 2005/0109821 A1 | 5/2005 | Li | |
| 2010/0047648 A1 * | 2/2010 | Aoyama et al. | 96/11 |

* cited by examiner

Primary Examiner — Jason M Greene

(57) ABSTRACT

A hydrogen purifier utilizing a hydrogen permeable membrane, and a gas-tight seal, where the seal is uses a low temperature melting point metal, which upon heating above the melting point subsequently forms a seal alloy with adjacent metals, where the alloy has a melting point above the operational temperature of the purifier. The purifier further is constructed such that a degree of isolation exists between the metal that melts to form the seal and the active area of the purifier membrane, so that the active area of the purifier membrane is not corrupted. A method of forming a hydrogen purifier utilizing a hydrogen permeable membrane with a seal of the same type is also disclosed.

17 Claims, 3 Drawing Sheets

HYDROGEN PURIFIER MODULE AND METHOD FOR FORMING THE SAME

This invention was made with Government support under DE-FG02-06ER84535 awarded by the Department of Energy. The Government has certain rights in this invention.

FIELD OF THE INVENTION

The present invention generally relates to a hydrogen purifier utilizing a hydrogen-permeable membrane to purify hydrogen from mixed gases containing hydrogen. A purifier module with improved sealing means is described where the seals are formed by first melting a metal with a low temperature melting point, and then allowing the metal to form a subsequent alloy which has a melting temperature above the operational temperature of the purifier.

BACKGROUND OF THE INVENTION

Hydrogen purifiers are devices that separate hydrogen from hydrogen-rich gaseous mixtures, providing a pure stream of hydrogen for a variety of uses. Typical applications include supplying hydrogen for fuel cells from reformed gases, purifying commercial grade hydrogen to provide for ultra-pure hydrogen used for semiconductor processing, supplying hydrogen for the food industry, purifying hydrogen from an electrolysis stream for laboratory uses, and many other industrial applications.

Typically hydrogen purifiers utilize a thin, hydrogen-permeable metal membrane to effectively separate hydrogen from a gaseous mixture containing hydrogen. While there are a variety of alloys, the most commonly used alloys are $Pd_{77}Ag_{23}$ and $Pd_{60}Cu_{40}$. These alloys are rolled into foils that are approximately 25 μm thick, and are then incorporated into a hydrogen purifier. Thinner foils may be used, but they are more fragile and prone to pinhole leaks, which degrades the purity of the supplied hydrogen.

A purifier may ideally operate between about 250° C. and 700° C. depending on the operating condition requirements, the material construction constraints of the purifier, and the gases introduced. For example, in a methanol steam reformer, the hydrogen rich gas produced by the reforming reaction will require a purifier operational temperature of at least about 300° C., in order to reduce the deleterious effects of carbon monoxide at the membrane surface. In other cases the reformer may use a different fuel, such as natural gas, in which the steam reforming temperature will be much higher, such as 550° C.-700° C. These different constraints will require different materials; for operation at 300-400° C. $Pd_{60}Cu_{40}$ will work well, but above about 400° C. $Pd_{77}Ag_{23}$ may be preferred due to its superior durability at higher temperatures. In either case, steam reforming with subsequent hydrogen separation utilizing a purifier will typically require a gas pressure in the range of 5-20 atmospheres on the high pressure side of the membrane for effective operation of the purifier. The permeate side pressure will vary depending on the output flux according to Sievart's law. Further, in some cases the temperature of the reformed gases must be reduced prior to their introduction to the purifier; it is generally desirable to maintain purifiers below 450° C. to prevent unwanted intermetallic diffusion between the membrane and the membrane support or seals at the perimeter. Conversely, purifiers will generally be operated above 300° C. to reduce the effects of carbon monoxide coverage (blockage) at the palladium membrane surface.

Generally, there are three basic issues which are addressed in the prior art concerning hydrogen purifiers: 1) membrane alloy selection, 2) mechanical support of the membrane, and 3) sealing of the membrane in a purification structure. In some cases the mechanical support and the sealing means are inter-related.

For example, in U.S. Pat. No. 6,183,542 Bossard discloses a foil-based hydrogen purifier where a hydrogen permeable foil, such as PdAg, is bonded between two wire mesh structures. The bonding process is envisioned either as a brazing step (by coating the mesh with a brazing powder) or by joining the materials at high temperature under pressure in a vacuum furnace in the range of 1900° F. (1038° C.). The resulting membrane does not lay flat, but rather undulates between the various wires of the mesh. In order to seal the perimeter, Bossard suggests utilizing a peripheral brazed seal, which would presumably fill the open areas of the metal mesh. At these high temperatures, however, significant inter-diffusion between the support and the membrane is expected to lower the hydrogen permeability.

Ogawa et. al show a composite structure for hydrogen purification in U.S. Pat. No. 5,782,960. Here the inventors utilize a foil bonded or laminated to a porous metal member. In the preferred embodiment the invention utilizes plural metallic supports with rectangular openings formed by an etching process. In the invention the supports are etched prior to attachment of the membrane. The described means of bonding or laminating consists of diffusion bonding or brazing.

In US 2003/0033933, Frost and B. Krueger further explore the patenting process with the membrane separator of Allegheny Technologies. In this and in preceding patents a hydrogen-permeable foil is disposed over a disc with a seal at the center and periphery (formed by welding), where the mechanical support of the membrane is accomplished with the use of a metal mesh. In this particular patent application Frost and Krueger further add a coating over the wire mesh of a nitride, oxide, boride, silicide, carbide, or aluminide to prevent intermetallic diffusion between the mesh and the membrane. The interdiffusion of iron and other elements is known to reduce the hydrogen permeability of the palladium alloy membrane, which as claimed by the inventors is blocked by the coatings. Similar architectures are also disclosed in U.S. Pat. No. 6,602,325, U.S. Pat. Nos. 6,835,232, and 6,582,499.

Another approach is taken by Juda et. al in U.S. Pat. No. 5,904,754. Here a method is disclosed for forming an effective perimeter seal with a PdCu membrane, utilizing diffusion bonding. Specifically, the inventors utilize a copper-surfaced metallic frame, compress the PdCu membrane to the perimeter, and condition the assembly in a hydrogen atmosphere at 290-325° C. for several hours to form an effective sealing diffusion bond between the frame and the membrane.

Li uses a similar approach in US 2005/0109821. However the inventor claims an improvement by utilizing a PdAg membrane (which can be processed at higher temperatures than PdCu), and eliminating the copper plating at the frame. Li observed strong bonding between the unplated stainless steel frame and the PdAg foil by diffusion bonding for 30 hours in a hydrogen atmosphere at 650° C.

While all of the above examples allow for the fabrication of membrane purifiers, each has certain inherent limitations. For example, with planar structures utilizing diffusion brazing or bonding to create perimeter seals, the surfaces must be highly polished or very flat in order to affect a seal. Small surface imperfections in the form of high or low spots, or scratches, which are typically present, make it very difficult to form a hermetic seal.

Brazing allows for some imperfections to be present while still yielding a seal, since the braze material will reflow and fill crevices with capillary action. However, brazing has two drawbacks. First, the high processing temperatures required to melt the braze can cause intermetallic diffusion to occur between a metallic membrane and the membrane support, as well as alteration of the crystal structure of the membrane. For example, processing $Pd_{60}Cu_{40}$ membranes above 400° C. for any length of time can cause permanent phase separation of the alloy, forming copper-rich regions, which destroys the hydrogen permeability of the material. Second, there is the risk that the brazing materials may contact the membrane, forming unwanted alloys while consuming the membrane. In some cases the braze material in contact with the membrane will actually cause perforations in the membrane.

Welding can be used to form a perimeter seal, however the material proximal to the weld may come under significant stress when the membrane expands on hydrogen uptake, while the other material (such as stainless steel) does not expand. This stress may cause eventual rupture and leakage of the seals after cycling the purifier thermally or with hydrogen a number of times. It is also difficult to form a welded seal on materials as thin as a 25 micron membrane, when the other materials (i.e., stainless steel parts, etc.) are much thicker.

Therefore an improved architecture and method of forming a hermetic seal with the purifier is needed.

SUMMARY OF THE INVENTION

The present invention relates to forming a seal in a hydrogen purifier utilizing a low temperature melting element or alloy, which subsequently forms a higher melting temperature alloy upon heat treatment, where the heat treatment temperature is low enough to substantially prevent either unwanted metallurgical changes in the hydrogen permeable membrane or significant interdiffusion from a support substrate such as stainless steel.

The following examples can be derived from phase diagrams commonly found in the literature, where we select some relevant examples with processing temperatures below about 550° C.:

Indium-Copper: Bonding at >480° C. should form a 45.2% copper phase with a melting point of 614° C.
Indium-Palladium: Bonding at >156° C. forms $In_3Pd$, which has a melting point of 664° C.
Indium-Silver: Bonding at >205° C. can form a stable silver-rich phase with a melting point of 660° C.
Indium-Gold: Bonding at >156° C. forms $AuIn_2$, which melts at 540° C.
Tin-Palladium: Bonding at >345° C. forms PdSn, which has a melting point of 600° C.
Tin-Copper: Bonding at >410° C. (melting point of $Cu_6Sn_5$) forms $Cu_3Sn$ which melts at about 650° C.
Tin-Silver: Bonding at >480° C. forms a silver-rich phase which has a melting point at 725° C. Bonding at over 221° C. forms an alloy stable to 480° C.
Tin-Iron (stainless steel): Bonding at >517° C. forms FeSn, which has a melting point of 770° C. Bonding at lower temperatures forms $FeSn_2$ which melts at 517° C.
Tin-Nickel: Bonding at >231° C. will form $Ni_3Sn_4$ which has a melting point of 794° C. This is relevant if there is a nickel strike and tin diffuses into this interface.

These combinations are only illustrative of combinations useful for the present invention; as there are other lower melting temperature metals which might also prove useful such as lead or cadmium, additional combinations should be apparent to those skilled in the art, including ternary and quaternary alloys.

In particular, if the purifier utilizes a $Pd_{77}Ag_{23}$ membrane supported on a stainless steel screen in a stainless steel structure, stainless-stainless and stainless-$Pd_{77}Ag_{23}$ seals might be needed. Stainless-to-stainless seals could be made by coating both stainless parts with silver plating on a nickel strike, with an additional plating of tin present at the interface. Upon heating the tin and silver would melt to form a liquid interface (filling the seal imperfections via capillary action), and if heated over 480° C. a silver-tin alloy will eventually form with a melting point of 725° C. For the stainless-$Pd_{77}Ag_{23}$ seal, the stainless part can again be plated with tin over silver, over a nickel strike. Upon heating the tin will melt and form alloys with the adjacent silver, as well as with the $Pd_{77}Ag_{23}$ membrane. PdSn will have a melting point of 600° C., and the tin-silver will again have a melting point of 725° C. Therefore on a theoretical level, a heat treatment of such a purifier at 480° C. or higher could produce a sealed unit capable of operation at least up to 600° C. without any concerns of the sealing joints re-forming a liquid phase. Since the purifier would ideally operate between 350-450° C., the method would be able to form an effective seal for the expected operating range without subjecting the purifier membrane to excessive temperatures during fabrication.

In another possible example, if the purifier utilizes a $Pd_{60}Cu_{40}$ membrane supported on a stainless steel screen in a stainless steel structure, stainless-stainless and stainless-$Pd_{60}Cu_{40}$ seals might be needed. In this case it is desirable to limit the processing temperature below about 450° C. to prevent unwanted changes in the $Pd_{60}Cu_{40}$ alloy, which might suggest the use of the tin-silver combination with a bonding temperature above 221° C., forming a seal effective up to temperatures of about 480° C. In both cases, the processing temperatures (slightly higher than 480° C. and 221° C., for the $Pd_{77}Ag_{23}$ and $Pd_{60}Cu_{40}$, respectively) would be significantly lower than the typical temperatures needed to form an effective brazed joint, which would have to be formed in the 600° C.-950° C. range, depending on the braze material.

One important aspect of the present invention is the ability to carefully tailor both the type of alloy formed (by selecting relative thicknesses of the respective platings, and the choice of elements plated), as well as the thickness of the resulting liquid layer during heat treatment. This in particular is important as the amount of liquid metal must be carefully controlled so as not to perforate the hydrogen-permeable membrane upon contact with the liquid metal. The amount of liquid can therefore be controlled so as to be sufficient to facilitate a seal at minor points of imperfections, while not providing enough liquid so as to compromise the membrane.

Another aspect of the invention is the ability to limit the location of the plated materials to selected areas of the parts. We have found, for example, that tin will readily migrate once it forms a liquid, and that plating an entire part with tin can be undesirable since tin may come into contact with the membrane at other areas besides the sealing surfaces. When this occurs, the tin will alloy with the membrane and the flux will be compromised. Therefore in areas where the tin is proximal to the membrane, it is limited to the perimeter or sealing areas. This is accomplished by coating the parts with a solvent-based plating barrier which is removed after the plating process. Likewise, it could also be possible to plate the entire part, and etch the plating off certain areas by coating the parts selectively with an acid dip barrier. While both methods work, we have found the former method to be the preferred embodiment.

The invention addresses the shortcomings of the prior art by making it possible to form purifiers with excellent sealing properties, while limiting the fabrication temperature required to form the seals.

BRIEF DESCRIPTION OF THE DRAWINGS

The above and other objects, features, and advantages of the present invention will become more apparent from the following detailed description taken with respect to the accompanying drawings in which.

DETAILED DESCRIPTION OF THE INVENTION

Figure 1:
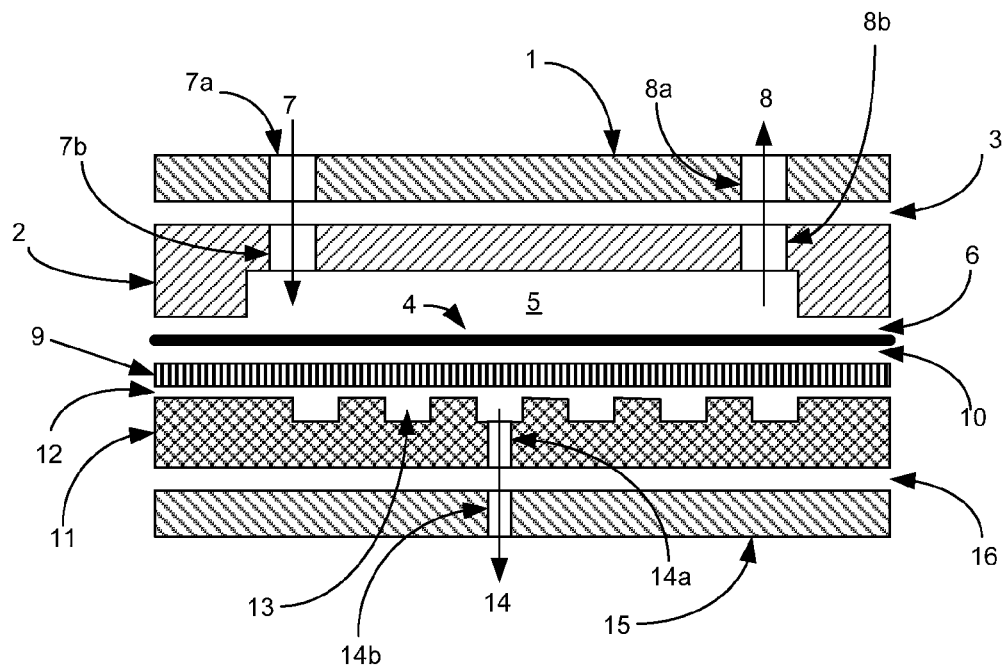
FIG. 1 illustrates the various parts comprising a hydrogen purifier.

Referring to the drawings, a general illustration of hydrogen purifier parts, prior to assembly, as applied to the present invention is shown in FIG. 1. Upper end plate 1, preferably formed of stainless steel, is adjacent to raffinate plate 2, also preferably formed of stainless steel. Mixed gas inlet passage 7 is defined by aligning passages consisting of hole 7a in upper end plate 1 and hole 7b in raffinate plate 2. End plate sealing interface 3 is defined by adjacent surfaces of upper end plate 1 and raffinate plate 2.

Hydrogen permeable membrane 4 is aligned with the perimeter of raffinate plate 2, forming pressurized mixed gas enclosure 5. Mixed gas exiting pressurized mixed gas enclosure 5 exits via mixed gas exit passage 8, defined by aligning passages consisting of hole 8a in upper end plate 1 and hole 8b in raffinate plate 2. Membrane sealing interface 6 is defined by adjacent surfaces of raffinate plate 2 and hydrogen permeable membrane 4.

Hydrogen permeable membrane 4 is adjacent to and supported by selectively etched screen 9, preferably made of stainless steel, and lower membrane sealing interface 10 is defined by adjacent surfaces of hydrogen permeable membrane 4 and selectively etched screen 9. Hydrogen collector plate 11 is adjacent to selectively etched screen 9, and permeate sealing interface 12 is defined by their adjacent surfaces at the perimeter. Permeate enclosure 13, receives hydrogen from hydrogen permeable membrane 4. Hydrogen entering permeate enclosure 13 will then freely travel to hydrogen exit path 14 through interconnecting passages in permeate enclosure 13 (not shown). Hydrogen exit path 14 consists of aligning passages comprised by hydrogen collector plate hole 14a and lower end plate hole 14b. Lower end plate 14 resides adjacent to hydrogen collector plate 11, defining a lower end plate sealing interface 16 between the members.

Figure 2:
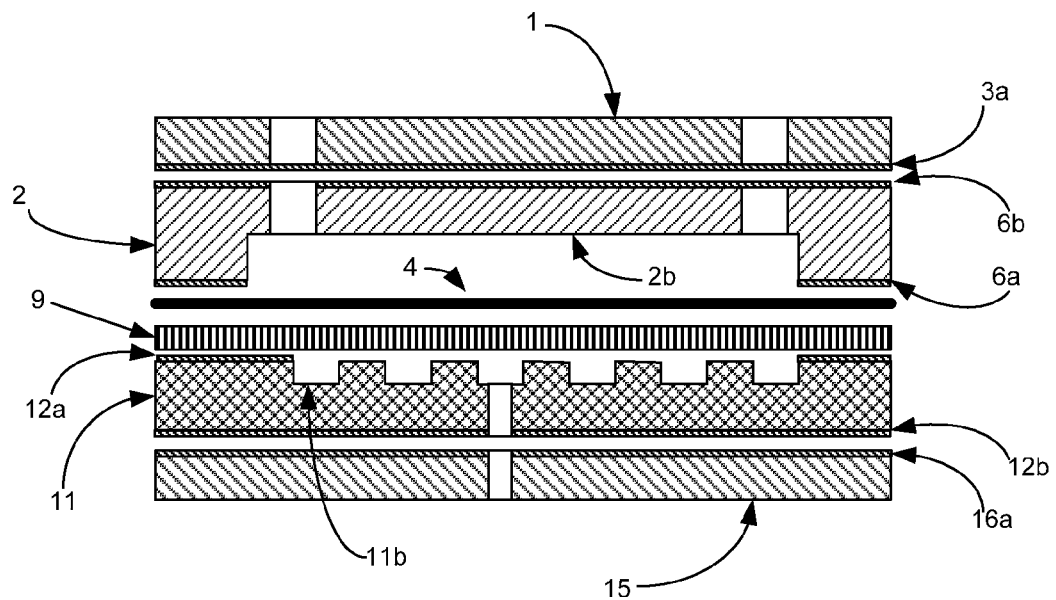
FIG. 2 shows the location of various coatings on the hydrogen purifier parts

Referring to FIG. 2, coatings may be applied to various parts to form a seal upon heat treatment. For end plate sealing interface 3 (FIG. 1), an end plate plate seal coating 3a may be applied to upper end plate 1. For membrane sealing interface 6 (FIG. 1), membrane sealing interface coating 6a may be applied to the perimeter of raffinate plate 2 which is adjacent to hydrogen permeable membrane 4. By selectively plating raffinate plate 2, membrane sealing interface coating 6a can be applied without covering raffinate plate uncoated area 2b. Membrane sealing interface coating 6a may also cover the surface of raffinate plate 2 adjacent to upper end plate 1, shown as coating 6b.

For permeate sealing interface 12 (FIG. 1) permeate seal coating 12a may be applied to hydrogen collector plate 11 at the perimeter, utilizing selective plating which leaves hydrogen collector interior surface 11b uncoated. The application of permeate seal coating 12a may also yield hydrogen collector plate coating 12b on the opposite face of hydrogen collector plate 11 if masking does not prevent plating of this surface. Hydrogen collector plate coating 12b, in addition to lower end plate coating 16a, provide sealing means for forming a seal at lower end plate sealing interface 16 upon heat treatment.

Figure 3:
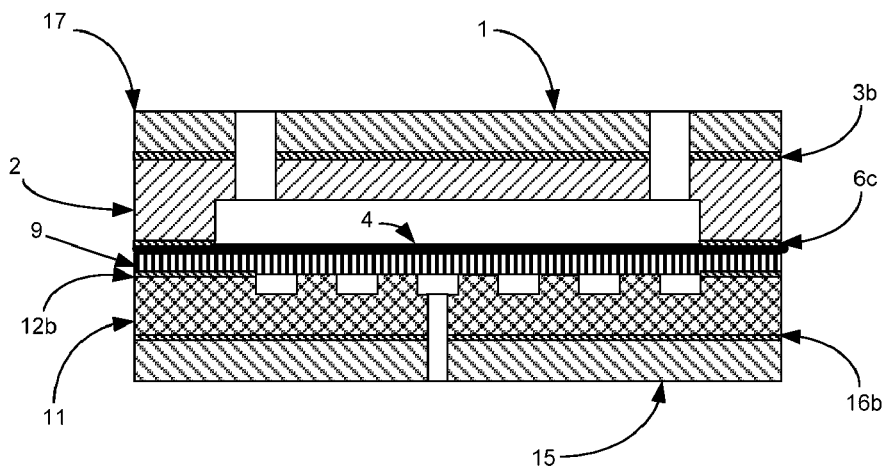
FIG. 3 shows the completed purifier after bonding

Referring to FIG. 3, hydrogen purifier 17 is formed upon compression of the parts illustrated in FIG. 2 and subsequent heat treatment, preferably in a reducing environment. End plate seal 3b will form an alloy both joining and sealing upper end plate 1 and raffinate plate 2. Membrane seal 6c will form an alloy both joining and sealing raffinate plate 2 and hydrogen permeable membrane 4. Membrane seal 6c and end plate seal 3b will prevent gas leakage from pressurized mixed gas enclosure 5 (FIG. 1) and exterior environment 27.

Lower membrane sealing interface 10 will seal by forming a diffusion bond between hydrogen permeable membrane 4 and selectively etched screen 9. Selectively etched screen 9 may also be plated with materials such as gold or other material (not shown) to facilitate this bond. Permeate seal 12b will form an alloy both joining and sealing selectively etched screen 9 and hydrogen collector plate 11. Lower end plate seal 16b will form an alloy both joining and sealing lower end plate 15 and hydrogen collector plate 11. Permeate seal 12b and lower end plate seal 16b will prevent gas leakage from permeate enclosure 13 (FIG. 1) and exterior environment 27.

Figure 4:
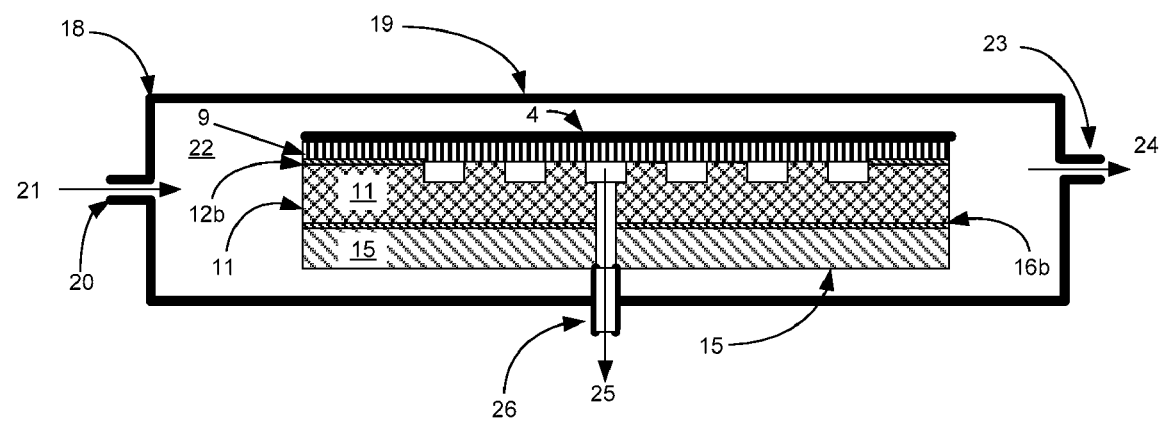
FIG. 4 shows an alternate configuration of a purifier after bonding

In FIG. 4, a portion of the purifier described in FIG. 3 is provided in an alternate configuration, forming alternate hydrogen purifier 18. Alternate hydrogen purifier 18 comprises a pressurized enclosure 19 with pressurized mixed gas 21 entering through gas inlet tube 20, residing in pressurized enclosure 22 and exiting as exit mixed gas 24 through exit tube 23. Permeate hydrogen 25 exits through hydrogen exit tube 26 joined to pressurized enclosure 19 and lower end plate 15. In this alternate format permeate seal 12b and lower end plate seal 16b will form a seal between permeated hydrogen 25 and gases residing in pressurized region 22, rather than exterior environment 27 shown in FIG. 3.

Figure 5:
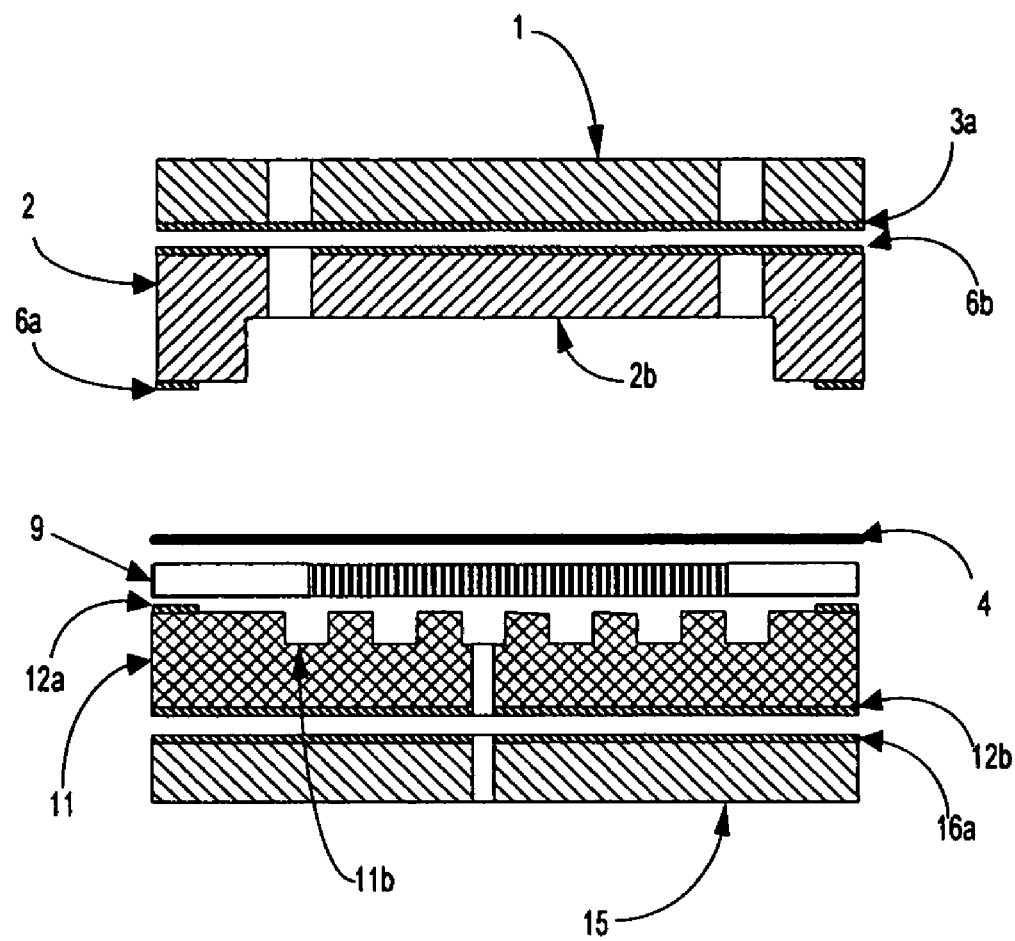
FIG. 5 shows the location of various coatings on the hydrogen purifier

In FIG. 5, coatings may be applied to various parts to form a seal upon heat treatment. For end plate sealing interface 3 (FIG. 1), an end plate plate seal coating 3a may be applied to upper end plate 1. For membrane sealing interface 6 (FIG. 1), membrane sealing interface coating 6a may be applied to the perimeter of raffinate plate 2 which is adjacent to hydrogen permeable membrane 4. By selectively plating raffinate plate 2, membrane sealing interface coating 6a can be applied without covering raffinate plate uncoated area 2b. Membrane sealing interface coating 6a may also cover the surface of raffinate plate 2 adjacent to upper end plate 1, shown as coating 6b.

For permeate sealing interface 12 (FIG. 1) permeate seal coating 12a may be applied to hydrogen collector plate 11 at the perimeter, utilizing selective plating which leaves hydrogen collector interior surface 11b uncoated. The application of permeate seal coating 12a may also yield hydrogen collector plate coating 12b on the opposite face of hydrogen collector plate 11 if masking does not prevent plating of this surface. Hydrogen collector plate coating 12b, in addition to lower end plate coating 16a, provide sealing means for forming a seal at lower end plate sealing interface 16 upon heat treatment.

In order to prevent surface and perimeter corruption of hydrogen permeable membrane 4, membrane sealing interface coating 6a and permeate seal coating 12a can be isolated from hydrogen permeable membrane 4. Selectively etched screen 9 may be formed such that it has a solid metal perimeter.

Other physical arrangements and coating combinations can be envisioned by those skilled in the art. For example, it is typically desirable to fabricate the hydrogen purifiers where multiple hydrogen permeable membranes may be used. In such a case, the mixed gas inlet and outlet passageways, as well as the permeated hydrogen exits are modified so that multiple units may be stacked together without occluding the entrance and exit of gases at the purifier. In another example, it may be desirable for the larger vessel, shown as pressurized enclosure 19 in FIG. 4, to contain permeated hydrogen rather than the pressurized mixed gases, in which case the architecture shown in FIG. 4 would be reversed.

In addition, while certain surfaces are or are not illustrated with coatings, the coating may be applied to only one surface, or alternatively on more surfaces than are illustrated in FIGS. 1-4. Further, the description of a "coating" is meant to denote at least one coating, which may collectively comprise a multilayer coating of different elements, such as copper, tin, nickel, or silver.

EXAMPLE 1

8 microns of silver were electroplated on a nickel strike on 304 stainless steel parts which define the permeate cavities ("hydrogen collector"), after which 1 micron of tin was electroplated over the silver plating at the perimeter of the parts by using a masking agent to prevent plating at the interior portion of the parts. Two end plates made of 304 stainless steel were also similarly plated with 2 microns of tin over 8 microns of silver on a nickel strike. A thin plating of gold on nickel strike was plated on 304 stainless steel parts which define the pressurized gas cavities ("raffinate plates"). Electrochemically etched 304 stainless steel screens were also plated with gold on nickel strike.

Four $Pd_{60}Cu_{40}$ membranes (25 microns thick, active area approximately 88 $cm^2$) were placed into a compressed assembly in the order of: end plate-4×(raffinate plate/membrane/screen/hydrogen collector)-end plate. The assembly was heated to 400° C. in a reducing atmosphere for 8 hours. A transient liquid phase bond was formed between the end plates and the respective raffinate plate (at the top) and the hydrogen collector (at the bottom), as well as between the raffinate plates and hydrogen collectors, and screen and hydrogen collector perimeter. Diffusion bonds were also formed between the gold plating of the raffinate plates, the membranes, and the screens. After the heat processing step, all of the seals were found to be free of leakage, and no leakage of Argon gas was detected through the membrane when the unit was pressurized with Argon. The purifier was subsequently operated at 400° C. with about 3.4 Bar high side hydrogen pressure, with resulting hydrogen permeation output of 5.6 standard liters per minute at ambient outlet pressure recorded after 100 hours of operation.

EXAMPLE 2

1 micron of tin was plated over 6 microns of silver (on a nickel strike) via selective plating at the perimeter of a 304 stainless steel hydrogen collector and raffinate plate. Once the parts were plated the solvent-based plating barriers were removed with acetone.

Two end plates made of 304 stainless steel were plated with 2 microns of tin over a nickel strike. An electrochemically etched 304 stainless steel screen was also plated with gold on nickel strike.

One $Pd_{77}Ag_{23}$ membrane (31 microns thick, active area approximately 88 $cm^2$) was placed into a compressed assembly in the order of: end plate-raffinate plate-membrane-screen-hydrogen collector-end plate. The assembly was heated to 550° C. in a reducing atmosphere for 5 hours. A transient liquid phase bond was formed between all the parts except the membrane and screen, which formed a sealing diffusion bond at the perimeter. After the heat processing step, all of the seals were found to be free of leakage, and no leakage of Argon gas was detected through the membrane when the unit was pressurized with Argon. The purifier was subsequently operated at 425° C. with about 3.4 Bar high side hydrogen pressure, with resulting hydrogen permeation output of 1.98 standard liters per minute at ambient outlet pressure recorded after 300 hours of operation.

What is claimed is:

1. A hydrogen purifier with a hydrogen permeable membrane with a hydrogen permeable area having an operational temperature and containing at least one gas-tight seal, where the seal comprises a metal with a solid phase above the operational temperature of the purifier, and where the seal metal composition includes a layer of at least one melting element of Pb, Sn, Bi, Te, Se, In, Cd, or Zn, and a layer of at least one additional element, and said seal metal is formed by melting the at least one melting element and forming an alloy or compound with the at least one additional element, and where the purifier further includes means for isolating the at least one melting element from the hydrogen permeable area of the hydrogen permeable membrane.

2. A hydrogen purifier as claimed in claim 1 where the final solid phase compound or alloy of the seal has a melting temperature above 300° C.

3. A hydrogen purifier as claimed in claim 1, where the additional element has a melting temperature above 700° C.

4. A hydrogen purifier as claimed in claim 1, where the final solid phase compound or alloy contains at least one of Pb, Sn, Bi, Te, Se, In, Cd, or Zn combined with at least one of Fe, Pd, Ag, Cu, Ni, or Au.

5. A hydrogen purifier as claimed in claim 1, where said isolation means consist of at least one of forming the seal in selected regions of the hydrogen purifier by either selective plating with a mask, or by plating followed by selective etching or reverse plating with an etching or reverse plating mask, prior to melting the melting element; separating the melting element from the hydrogen permeable area of the hydrogen permeable membrane with a separation distance of at least 100 times the thickness of the layer of the melting element; or providing a collection trough for collection of excess liquid melting element material.

6. A hydrogen purifier module effective for purifying hydrogen from a pressurized mixed gas stream containing hydrogen, with an effective operating temperature range, comprising:
   a) an at least one metallic hydrogen-permeable membrane having a hydrogen permeable area
   b) an at least one pressurized metallic enclosure containing a mixed gas stream containing hydrogen, effective to bring the mixed gas stream containing hydrogen adjacent to said membrane;

c) an at least one permeate metallic enclosure effective to receive hydrogen permeating through said metallic hydrogen-permeable membrane;

d) an at least one gas inlet path for bringing a pressurized mixed gas stream containing hydrogen into said pressurized metallic enclosure, and an at least one gas exit path for removing said pressurized mixed gas stream containing hydrogen from said pressurized metallic enclosure, after the gas has transferred a portion of the hydrogen to the metallic hydrogen-permeable member;

e) an at least one gas exit path for transferring permeated hydrogen out of the hydrogen purifier module where the hydrogen purifier module further comprises at least one of:

f) sealing means between the pressurized metallic enclosure containing a mixed gas stream containing hydrogen and the exterior of the hydrogen purifier module;

g) sealing means between the permeate metallic enclosure and the exterior of the hydrogen purifier module;

h) sealing means between the pressurized metallic enclosure containing a mixed gas stream containing hydrogen and the permeate metallic enclosure;

where said sealing means are accomplished by an at least one coating at least one of the metallic members with at least one element or first metal alloy, and heating the purifier to a temperature effective to form a liquid seal by melting the at least one metal element or first metal alloy, and further heating the purifier until a final solid phase compound or alloy is formed at the location of the liquid seal with a melting temperature above the effective operating temperature range of the purifier, and where the purifier further includes means for isolating the melting element from the hydrogen permeable area of the membrane.

7. A hydrogen purifier as claimed in claim 6, where the coating has a first melting temperature below 550° C., and where the final solid phase compound or alloy has a melting temperature above 300° C.

8. A hydrogen purifier as claimed in claim 6 where the coating has a first melting temperature below 550° C., and where the final solid phase compound or alloy has a melting temperature above 300° C., and further contains at least one of Pb, Sn, Bi, Te, Se, In, Cd, or Zn.

9. A hydrogen purifier as claimed in claim 6, where the coating thickness contains at least one of Pb, Sn, Bi, Te, Se, In, Cd, or Zn and is between 0.1 microns and 20 microns.

10. A hydrogen purifier as claimed in claim 6, where the coating with at least one element or first metal alloy further comprising a second element with a melting temperature above 700° C., where said second element and the at least one element or first metal alloy forms a solid phase compound or alloy with a melting temperature above the effective operating temperature range of the purifier.

11. A hydrogen purifier as claimed in claim 6 where the final solid phase compound or alloy contains at least one of Pb, Sn, Bi, Te, Se, In, Cd, or Zn combined with at least one of Fe, Pd, Ag, Cu, Ni, or Au.

12. A hydrogen purifier as claimed in claim 6, where said isolation means consist of at least one of forming the seal in selected regions of the hydrogen purifier by either selective plating with a mask, or by plating followed by selective etching or reverse plating with an etching or reverse plating mask, prior to melting the melting element; separating the melting element from the permeable area of the hydrogen permeable membrane with a separation distance of at least 100 times the thickness of the melting element; or providing a collection trough for excess melting element material.

13. A method of forming one or more seals in a hydrogen purifier module effective for purifying hydrogen from a pressurized mixed gas stream containing hydrogen, with an effective operating temperature range, where the method comprises: providing a hydrogen purifier module comprising:

a) an at least one metallic hydrogen-permeable membrane having a hydrogen permeable area b) an at least one pressurized metallic enclosure containing a mixed gas stream containing hydrogen, effective to bring the mixed gas stream containing hydrogen adjacent to said membrane;

c) an at least one permeate metallic enclosure effective to receive hydrogen permeating through said metallic hydrogen-permeable membrane;

d) an at least one gas inlet path for bringing a pressurized mixed gas stream containing hydrogen into said pressurized metallic enclosure, and an at least one gas exit path for removing said pressurized mixed gas stream containing hydrogen from said pressurized metallic enclosure, after the gas has transferred a portion of the hydrogen to the metallic hydrogen-permeable member;

e) an at least one gas exit path for transferring permeated hydrogen out of the hydrogen purifier module where the hydrogen purifier module further comprises at least one of:

f) sealing means between the pressurized metallic enclosure containing a mixed gas stream containing hydrogen and the exterior of the hydrogen purifier module;

g) sealing means between the permeate metallic enclosure and the exterior of the hydrogen purifier module;

h) sealing means between the pressurized metallic enclosure containing a mixed gas stream containing hydrogen and the permeate metallic enclosure;

coating at least one of the metallic members with a melting element of at least one of Pb, Sn, Bi, Te, Se, In, Cd, or Zn, while isolating the melting element from the hydrogen permeable area of the membrane and heating the purifier module to a temperature sufficient to melt the coating, with the coating subsequently forming a seal of a solid phase compound or alloy at a temperature between 150° C.-700° C., where the resulting solid phase compound or alloy has a melting temperature above the upper operating temperature range of the purifier.

14. A method as claimed in claim 13, further comprising coating at least one of the metallic members with a second coating which forms a solid phase compound or alloy with the first coating at a temperature between 150° C. and 700° C., where the resulting solid-phase alloy or alloys have a melting temperature above the upper operating temperature range of the purifier.

15. A method of forming one or more seals in a hydrogen purifier module effective for purifying hydrogen from a pressurized mixed gas stream containing hydrogen as claimed in claim 13, where said isolation consists of at least one of forming the seal in selected regions of the hydrogen purifier by either selective plating with a mask, or by plating followed by selective etching or reverse plating with an etching or reverse plating mask, prior to melting the melting element; separating the melting element from the permeable area of the hydrogen permeable membrane with a separation distance of at least 100 times the thickness of the melting element; or providing a collection trough for excess melting element material.

16. A method of forming one or more seals in a hydrogen purifier module with a final solid phase compound or alloy as claimed in claim 13 where the compound or alloy is formed with a composition containing at least one of Pb, Sn, Bi, Te, Se, In, Cd, or Zn combined with at least one of Fe, Pd, Ag, Cu, Ni, or Au.

17. A method of forming one or more seals in a hydrogen purifier module as claimed in claim 13 where the coating contains at least one of Pb, Sn, Bi, Te, Se, In, Cd, or Zn and is between 0.1 microns and 20 microns thick.

* * * * *